(12) United States Patent
Berger et al.

(10) Patent No.: US 6,905,554 B2
(45) Date of Patent: Jun. 14, 2005

(54) METHOD AND DEVICE FOR CLEANING A VEHICLE

(75) Inventors: Oliver Berger, Marbach (DE); Peter Tews, Reutlingen (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 10/615,594

(22) Filed: Jul. 7, 2003

(65) Prior Publication Data

US 2004/0065348 A1 Apr. 8, 2004

Related U.S. Application Data

(63) Continuation of application No. PCT/EP01/13964, filed on Nov. 29, 2001.

(30) Foreign Application Priority Data

Jan. 8, 2001 (DE) .......................................... 101 01 018

(51) Int. Cl.$^7$ ................................................. B08B 7/04
(52) U.S. Cl. ...................... 134/18; 134/56 R; 134/123; 15/DIG. 2
(58) Field of Search .............................. 134/18, 6, 34, 134/113, 123, 56 R; 15/DIG. 2

(56) References Cited

U.S. PATENT DOCUMENTS

| | | | |
|---|---|---|---|
| 3,658,590 A | * 4/1972 | Huebner et al. | ............... 134/32 |
| 4,893,229 A | * 1/1990 | Detrick | ......................... 700/11 |
| 4,913,357 A | 4/1990 | Bolyard et al. | |
| 5,076,304 A | 12/1991 | Mathews | |
| 5,447,574 A | 9/1995 | Inoue | |
| 6,193,808 B1 | 2/2001 | Decker | |
| 6,325,863 B1 | * 12/2001 | Zamensky et al. | ............ 134/18 |

FOREIGN PATENT DOCUMENTS

| | | |
|---|---|---|
| AU | 58740/86 | 12/1986 |
| DE | 19 53 027 | 10/1969 |
| DE | 22 31 846 | 1/1974 |
| DE | 27 53 137 | 3/1980 |
| DE | 692 09 120 | 9/1996 |
| DE | 197 51 016 | 5/1999 |
| EP | 0 379 353 | 7/1990 |
| WO | 01/49538 | 7/2001 |

OTHER PUBLICATIONS

Patent Abstracts of Japan, Akira, Igari, "Washing Method of Car Washer", Publication No. 09164922, Jun. 24, 1997.

* cited by examiner

*Primary Examiner*—Michael Barr
*Assistant Examiner*—Saeed Chaudhry
(74) *Attorney, Agent, or Firm*—Lipsitz & McAllister, LLC (57) ABSTRACT

The invention relates to a method for cleaning a vehicle with a vehicle washing facility which comprises at least one first cleaning tool which is vertically aligned and can be moved past the vehicle in a longitudinal and in a transverse direction thereof and at least one second cleaning tool which is horizontally aligned, can be moved in a longitudinal direction of the vehicle and can be adjusted in a vertical direction in accordance with the contour of the vehicle. In order to develop the method further in such a manner that extra long vehicles can also be cleaned, it is suggested in accordance with the invention that a checking device checks whether the length of the vehicle exceeds a predetermined maximum value and that the rear of the vehicle and/or the front of the vehicle be cleaned only with the first or only with the second cleaning tool when the length of the vehicle exceeds the maximum value.

23 Claims, 4 Drawing Sheets

METHOD AND DEVICE FOR CLEANING A VEHICLE

This application is a continuation of International application number PCT/EP01/13964 filed on Nov. 29, 2001.

The present disclosure relates to the subject matter disclosed in International application No. PCT/EP01/13964 of Nov. 29, 2001, which is incorporated herein by reference in its entirety and for all purposes.

BACKGROUND OF THE INVENTION

The invention relates to a method for cleaning a vehicle with a vehicle washing facility which comprises at least one first cleaning tool which is vertically aligned and can be moved past the vehicle to be cleaned in a longitudinal and in a transverse direction thereof and at least one second cleaning tool which is horizontally aligned, can be moved in a longitudinal direction of the vehicle and can be adjusted in a vertical direction in accordance with the contour of the vehicle.

In addition, the invention relates to a vehicle washing facility for carrying out the method.

The cleaning of a vehicle in a vehicle washing facility is normally brought about by means of cleaning brushes which can be moved along the vehicle and during the cleaning touch the surface of the vehicle for removing dirt. Vehicle washing facilities are also known, with which the cleaning takes place without any contact in that a cleaning liquid is sprayed onto the vehicle under high pressure. For this purpose, a plurality of nozzle arrangements are normally used which are aligned vertically and horizontally and surround the vehicle to be cleaned in the manner of a portal frame.

The longitudinal sides of a vehicle can normally be cleaned by means of the first cleaning tools specified at the outset, for example, in the form of wash brushes rotatable about a vertical axis of rotation and the second cleaning tools specified at the outset, for example, in the form of a wash brush rotatable about a horizontal axis of rotation are normally used for cleaning the hood, the roof of the vehicle as well as, where applicable, the trunk lid. The front and rear sections of the vehicle which are particularly prone to dirt are often cleaned not only with the first but also with the second cleaning tools. For this purpose, the first cleaning tools can be displaced not only in a longitudinal direction but also in a transverse direction along the vehicle and the second cleaning tools can be lowered in a vertical direction to such an extent that the front and rear sections can also be covered with their help. If, however, extra long vehicles are intended to be cleaned, it is possible that the space within the vehicle washing facility will not be sufficient for moving the two cleaning tools around the entire vehicle.

The object of the present invention is to make available a method of the type specified at the outset as well as a vehicle washing facility suitable for this purpose, with the aid of which extra long vehicles can also be cleaned.

SUMMARY OF THE INVENTION

This object is accomplished in accordance with the invention, in a method of the generic type, in that a checking device checks whether the length of the vehicle exceeds a predetermined maximum value and that the rear of the vehicle and/or the front of the vehicle are cleaned only with the first or only with the second cleaning tool when the length of the vehicle exceeds the maximum value.

The idea is incorporated into the invention that even extra long vehicles can be cleaned in a vehicle washing facility with confined space conditions in that the rear of the vehicle and/or the front of the vehicle are cleaned with only one of the cleaning tools, i.e., only with the at least one first cleaning tool or only with the at least one second cleaning tool insofar as the length of the vehicle exceeds a maximum value which can be predetermined by the length of the respective vehicle washing facility. In accordance with the invention, a checking device checks whether the length of the vehicle to be cleaned exceeds the predetermined maximum value. If this is not the case, not only the first but also the second cleaning tools are used in a customary manner for cleaning the front of the vehicle and/or the rear of the vehicle. If, however, an extra long vehicle is present and so its length exceeds the maximum value, only one of the first and second cleaning tools is selected for cleaning the front of the vehicle and/or the rear of the vehicle. The selection is carried out automatically by means of the checking device and so a manual adjustment by the user or operator of the vehicle washing facility is not necessary.

In a particularly simple procedure it may be provided for it to be checked first of all, prior to activating the first and second cleaning tools, whether the length of the vehicle exceeds the maximum value. Such a check can be carried out, for example, while the vehicle is being driven into the vehicle washing facility. If the checking device detects an extra long vehicle, the first and second cleaning tools are activated in such a manner that the cleaning of the front area and/or of the rear area is carried out only with the first or only with the second cleaning tools.

In order to be able to utilize the space within a vehicle washing facility in an optimum manner for cleaning an extra long vehicle, it is provided in a preferred embodiment of the inventive method for the vehicle to be moved, prior to activating the first and second cleaning tools, beyond a predeterminable drive-in position forwards as far as a stop position and its front area to be subsequently cleaned only with the second cleaning tool insofar as the length of the vehicle exceeds the maximum value. Such a procedure offers the possibility of positioning relatively short vehicles in a customary manner within the vehicle washing facility at the drive-in position and, subsequently, of cleaning the front and rear areas of the vehicle not only with the first but also with the second cleaning tools. If, however, an extra long vehicle is intended to be cleaned, it is ascertained during its positioning in the drive-in position that its vehicle length exceeds the predetermined maximum value. As a result, the vehicle is moved in a drive-in direction further forwards as far as a stop position which can be characterized by the fact that the first cleaning tools already take up a position to the side of the vehicle. The second cleaning tool is then positioned directly in front of the vehicle and the front of the vehicle is cleaned merely with this second cleaning tool. As a result, it may be ensured in a simple manner that only extra long vehicles are cleaned in the front area only with the second cleaning tool whereas vehicles with a length which does not exceed the maximum value can be cleaned in the front area not only with the first but also with the second cleaning tool.

In an alternative embodiment of the method it is provided for it to be checked, when a first and/or second cleaning tool is already activated, whether the length of the vehicle exceeds the maximum value. Such a procedure has the advantage that the cleaning time can be reduced since the checking of the length of the vehicle is carried out at the same time as the cleaning of the vehicle by the first and/or second cleaning tools.

It is of advantage, particularly when checking the length of the vehicle during the cleaning of the vehicle, when the rear of the vehicle is cleaned only with the first cleaning tool insofar as the length of the vehicle exceeds the maximum value. Such a procedure is of advantage, in particular, when the first and second cleaning tools are supported on a transport device which can be displaced along a guideway, wherein the length of the vehicle is checked while the transport device is being displaced in the direction towards the rear of the vehicle. If the checking device ascertains during the displacement of the transport device that the length of the vehicle exceeds the maximum value, the second cleaning tool can, for example, be deactivated so that the rear of the vehicle is cleaned only with the first cleaning tool.

It is of advantage when it is checked by means of at least one sensor operating without contact whether the length of the vehicle exceeds the maximum value. Damage to the surface of the vehicle while the length of the vehicle is being checked is avoided as a result.

As mentioned at the outset, the invention relates, in addition, to a vehicle washing facility for carrying out the method explained above comprising at least one first cleaning tool which is vertically aligned and can be moved past the vehicle to be cleaned in a longitudinal and in a transverse direction thereof and comprising at least one second cleaning tool which is horizontally aligned, can be moved in a longitudinal direction of the vehicle and can be adjusted in a vertical direction in accordance with the contour of the vehicle.

In the case of such a vehicle washing facility, the object specified at the outset is accomplished in accordance with the invention in that the vehicle washing facility comprises a checking device for checking whether the length of the vehicle exceeds a predetermined maximum value and that only the at least one first cleaning tool or only the at least one second cleaning tool can be activated for cleaning the front of the vehicle and/or the rear of the vehicle when the length of the vehicle exceeds the maximum value.

As already explained, it can be ensured by means of the checking device that in the case of extra long vehicles the cleaning of the rear and/or front areas is carried out only with the first or only with the second cleaning tools whereas not only the first but also the second cleaning tools are used for cleaning the remaining areas of the vehicle in the customary manner.

The checking device preferably comprises a sensor unit which operates, in particular, without contact and is positioned at a predetermined distance in relation to a front end of the vehicle washing facility with respect to the drive-in direction of the vehicle to be cleaned. As a result of the positioning of the sensor unit, the maximum value of the length of the vehicle can be predetermined and the rear of the vehicle and/or the front of the vehicle are cleaned not only with the first but also with the second cleaning tools until this maximum value is reached. If, however, the length of the vehicle exceeds this maximum value, only the first or only the second cleaning tools will be selected for cleaning the front and/or the rear area.

In one development of the inventive vehicle washing facility which is particularly simple from a constructional point of view, it is provided for the sensor unit to be designed as a light barrier.

It may be provided for the vehicle washing facility to comprise merely a single first cleaning tool which is mounted so as to be displaceable around the entire vehicle so that with its aid front and rear areas as well as both longitudinal sides of the vehicle can be cleaned reliably. This does, however, entail a not inconsiderable cleaning time.

In a preferred embodiment it is provided for the vehicle washing facility to comprise two first cleaning tools which can each be positioned on one side of the vehicle to be cleaned. Both longitudinal sides of the vehicle can be cleaned at the same time by means of the two first cleaning tools. Since the two first cleaning tools can also be displaced transversely to the vehicle, the front of the vehicle and the rear of the vehicle can also be cleaned with their help.

The first cleaning tools can be designed, for example, as wash brushes rotatable about a vertical axis of rotation.

A wash brush rotatable about a horizontal axis of rotation can be used as a second cleaning tool.

In order to avoid any damage to the surface of the vehicle, it is of advantage when the first cleaning tools comprise at least one nozzle arrangement which is vertically aligned and can be acted upon with cleaning liquid for cleaning the vehicle. A contact-less cleaning of the surface of the vehicle can be ensured by means of the nozzle arrangement.

In order to clean the vehicle reliably along its two longitudinal sides and also in the front and rear areas by means of the first cleaning tools, it may be provided in accordance with the invention for the nozzle arrangement to comprise at least two groups of nozzles, wherein a first group of nozzles faces the vehicle to be cleaned during a transverse movement and a second group of nozzles during a longitudinal movement of the nozzle arrangement. This makes it possible to clean, for example, the front area as well as one longitudinal side of the vehicle with the two groups of nozzles of a first nozzle arrangement. The rear area and the other longitudinal side of the vehicle may be sprayed or squirted with cleaning liquid for cleaning with the two groups of nozzles of a second nozzle arrangement.

In a particularly preferred development of the inventive vehicle washing facility it is provided for at least one nozzle arrangement to comprise three groups of nozzles, wherein a first group of nozzles faces the vehicle during a transverse movement in front of the vehicle to be cleaned, a second group of nozzles during a longitudinal movement along a longitudinal side of the vehicle and a third group of nozzles during a transverse movement behind the vehicle to be cleaned. With such a configuration it is merely necessary to design a single nozzle arrangement so as to be movable not only in a transverse but also in a longitudinal direction. A nozzle arrangement movable only in a longitudinal direction can be used, in addition, for the cleaning of the remaining, second longitudinal side of the vehicle.

In order to also be able to clean the area of the hood and the roof of the vehicle without any contact, it is favorable when a second cleaning tool is designed as a nozzle arrangement which is horizontally aligned, can be acted upon with cleaning liquid and comprises first and second groups of nozzles, wherein with respect to the drive-in direction of the vehicle to be cleaned the first group of nozzles is directed at the vehicle with a directional component pointing rearwards at an angle and the second group of nozzles with a directional component pointing forwards at an angle. The front and rear areas of the vehicle can also be cleaned reliably in addition to the area of the hood and the roof the vehicle by means of such a horizontally aligned nozzle arrangement since, for this purpose, the nozzle arrangement comprises groups of nozzles directed at an angle towards the front of the vehicle or towards the rear of the vehicle.

It is of advantage, in particular, in the case of cleaning of the vehicle without contact when control sensors are associated with the first and second cleaning tools for controlling the cleaning tools during their movement along the vehicle.

This makes it possible to arrange the cleaning tools so as to be movable at a predeterminable distance in relation to the vehicle. Particularly when using nozzle arrangements, it can be ensured by means of the control sensors in a constructionally simple manner that the nozzle arrangements are each arranged at such a distance in relation to the surface of the vehicle that an optimum cleaning result can be achieved when the vehicle is acted upon with cleaning liquid. This incorporates the idea that too great a distance of the nozzle arrangement from the vehicle during the cleaning by means of high-pressure jets leads to a deterioration in the resulting cleaning and that with too small a distance the risk of damage to the vehicle on account of a collision with the nozzle arrangement exists.

The first and second cleaning tools are, with respect to the drive-in direction of the vehicle to be cleaned, preferably held on a transport device displaceable along a guideway so as to be offset relative to one another and form front and rear cleaning tools, wherein an end sensor is arranged between the front and rear cleaning tools for detecting the front and/or rear end of the vehicle. The cleaning tools can be moved along the vehicle by means of the transport device and the front or rear end of the vehicle can be detected with the aid of the end sensor arranged between the front and rear cleaning tools.

The end sensor preferably comprises a light barrier aligned at an angle to the horizontal. The light barrier has a light emitter and a light receiver which are arranged at different levels so that the front and/or rear end of the vehicle can be detected reliably, irrespective of the vehicle construction, by means of the beam of light directed at an angle.

It is of advantage when the vehicle washing facility comprises a front and/or rear end switch which makes a signal available insofar as the transport device has reached the front and/or rear end of the guideway with respect to the drive-in direction of the vehicle to be cleaned. The signal made available by the end switch can be used, for example, for activating a drive unit of the transport device.

In a particularly preferred embodiment of the invention, it is provided for the checking device to comprise a control unit which is coupled to the end switch, the end sensor as well as to the control sensor of the front and/or rear cleaning tool and controls the front and rear cleaning tools for cleaning the front of the vehicle and/or the rear of the vehicle. Such a configuration has the advantage that the first and second cleaning tools can also be controlled at the same time for cleaning the front and/or rear area by means of the control unit and the sensors and switches which ensure a faultless functioning of the vehicle washing facility.

It may, for example, be provided, with respect to the drive-in direction of the vehicle to be cleaned, for the front cleaning tool to be deactivatable by means of the control unit insofar as not only the rear end switch but also the control sensor of the front cleaning tool are activated and the end sensor indicates the rear of the vehicle has peen passed. Such a configuration makes it possible in a constructionally simple manner to clean the vehicle and check its length at the same time. Proceeding from the front of the vehicle, the transport device with the front and rear cleaning tools held thereon can be moved in the direction towards the rear of the vehicle. If this is an extra long vehicle, it is possible that during the movement of the transport device only the rear cleaning tool with respect to the drive-in direction as well as the end sensor arranged between the cleaning tools go past the rear of the vehicle but that the end switch is already indicating that the rear end position for the transport device has been reached before the front cleaning tool with respect to the drive-in direction has also reached the rear of the vehicle. In such a case, the control unit selects only the rear cleaning tool in drive-in direction for cleaning its rear area whereas the front cleaning tool is deactivated by the control unit. If, instead of an extra long vehicle, a vehicle with a relatively short length is cleaned, both cleaning tools can go past the rear of the vehicle during the movement of the transport unit before the end switch is activated and both cleaning tools can be used for cleaning the rear area, i.e., there is no deactivation of one of the two cleaning tools.

It may, of course, also be provided for the transport unit to be moved in the direction of the front of the vehicle during the cleaning of the vehicle. In this respect, it is of advantage when the rear cleaning tool with respect to the drive-in direction of the vehicle to be cleaned can be deactivated by means of the control unit insofar as not only the front end switch but also the control sensor of the rear cleaning tool are activated and the end sensor indicates the front of the vehicle has been passed.

The following description of two preferred embodiments of the invention serves to explain the invention in greater detail in conjunction with the drawings.

BRIEF DESCRIPTION OF THE DRAWINGS

FIG. 3: shows a schematic plan view of a first embodiment of an inventive vehicle washing facility when an extra long vehicle is driven in;

DETAILED DESCRIPTION OF THE INVENTION

Figure 1:
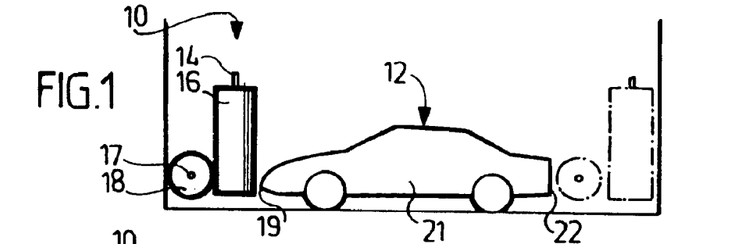
FIG. 1: shows a schematic side view of a conventional vehicle washing facility.
Figure 2:
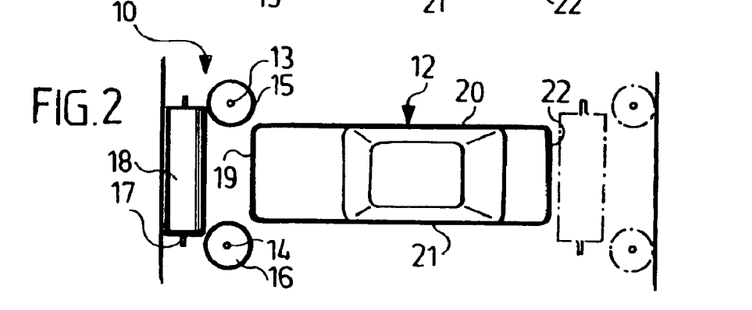
FIG. 2: shows a schematic plan view of a conventional vehicle washing facility.

A known vehicle washing facility 10, in which a relatively short vehicle 12 is positioned, is illustrated in FIGS. 1 and 2 in a schematic representation. The vehicle washing facility 10 comprises in a customary manner two side brushes 15 and 16 each rotatable about a vertical axis of rotation 13 and 14, respectively, as well as a roof brush 18 which can be rotated about an axis of rotation 17 aligned horizontally and can be adjusted in a vertical direction in accordance with the contour of the vehicle 12. The side brushes 15, 16 as well as the roof brush 18 are held on a common portal frame which is known per se and, therefore, not illustrated in the drawings and can be moved back and forth along the vehicle 12. At the beginning of the cleaning process, the side and roof brushes 15, 16, 18—as illustrated in FIGS. 1 and 2 by solid lines— are positioned in front of the front area 19 of the vehicle 12. The two side brushes 15 and 16 can be moved not only in a longitudinal direction but also in a transverse direction of the vehicle 12 and at the beginning of a cleaning process for the cleaning of the front area 19 are each moved in a transverse direction approximately as far as the center of the vehicle and back into their starting position. Subsequently, the side brushes 15, 16 are moved along the longitudinal sides 20, 21 of the vehicle as far as behind the rear 22 of the vehicle. In this position, the side and roof brushes 15, 16, 18 are illustrated in FIGS. 1 and 2 by dash-dot lines. While the side brushes 15, 16 are being moved along the longitudinal sides 20, 21 of the vehicle 12, the roof brush 18 is moved at the same time over the vehicle 12 in accordance with the contour of the vehicle as far as its rear area 22, wherein cleaning of the front area 12 is carried out first of all by means of the roof brush 18, as well. If the side brushes 15, 16 reach the rear 22, they are moved for its cleaning in a transverse direction as far as approximately to the center of the vehicle and back and, subsequently, an additional cleaning of the rear takes place by means of the roof brush 18.

The method for cleaning the vehicle 12 explained above has proven to be successful for relatively short vehicles. If, however, extra long vehicles are intended to be cleaned, this can result in a cleaning of the front and rear areas of the vehicle with side and roof brushes no longer being possible.

Figure 3:
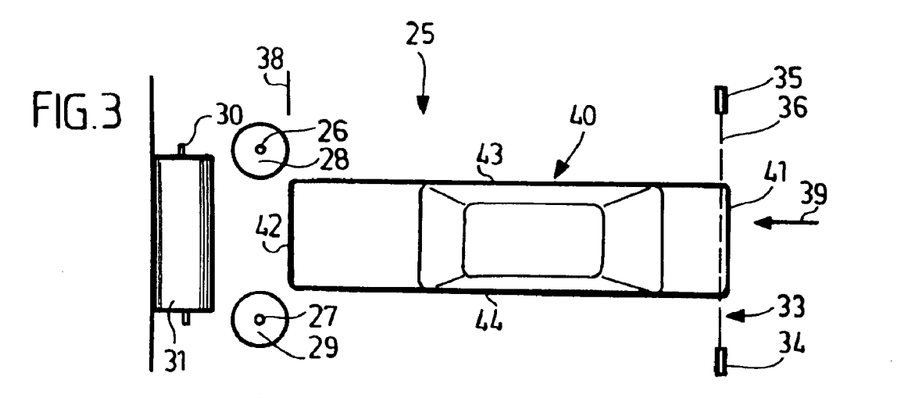
Figure 4:
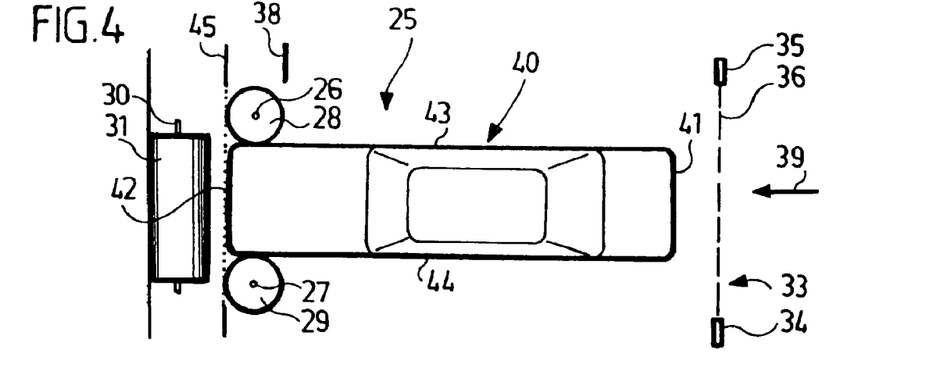
FIG. 4: shows a schematic plan view according to FIG. 3 with an extra long vehicle in its end position.

A first embodiment of a vehicle washing facility in accordance with the present invention, with the aid of which extra long vehicles can also be cleaned in their front and rear areas, is illustrated in FIGS. 3 and 4 in a schematic representation. The vehicle washing facility is designated in FIGS. 3 and 4 with the reference numeral 25. It likewise comprises two side brushes 28 and 29 each rotatable about a vertically aligned axis of rotation 26 and 27, respectively, as well as a roof brush 31 which is rotatable about a horizontally aligned axis of rotation 30, these brushes being held on a common, conventional portal frame which is not therefore illustrated in the drawings. The side brushes 28 and 29 form first cleaning tools which can be moved past a vehicle to be cleaned not only in a longitudinal but also in a transverse direction thereof. The roof brush 31 forms a second cleaning tool which can be adjusted in a vertical direction in accordance with the contour of the vehicle to be cleaned and can be moved in a longitudinal direction of the vehicle.

The vehicle washing facility 25 comprises a sensor unit in the form of a light barrier 33 with a light emitter 34 and a light receiver 35 at a distance from the front end position of the side and roof brushes 28, 29 and 31 illustrated in FIGS. 3 and 4. A beam of light 36 aligned transversely to the longitudinal direction of the vehicle can be directed onto the light receiver 35 by means of the light emitter 34.

If a vehicle is intended to be cleaned by means of the vehicle washing facility 25, this is driven first of all into the vehicle washing facility 25 as far as a drive-in position 38. With respect to the drive-in direction symbolized by the arrow 39, the side brushes 28 and 29 as well as the roof brush 31 are positioned in front of the drive-in position 38. If an extra long vehicle is intended to be cleaned, as designated in FIGS. 3 and 4 with the reference numeral 40, its rear area 41 projects beyond the light barrier 33 contrary to the drive-in direction 39 and so the beam of light 36 is interrupted. The interruption of the beam of light 36 indicates that the length of the vehicle 40 exceeds a maximum length determined by the distance between the drive-in position 38 and the position of the light barrier 33. The extra long vehicle 40 is, as a result, moved forwards in drive-in direction 39 as far as a stop position 45. The stop position 45 is characterized by the fact that only the roof brush 31 is positioned in front of the front area 42 whereas the side brushes 28 and 29 each take up a position at a longitudinal side 43 and 44, respectively, of the vehicle 40.

Following the positioning of the extra long vehicle 40 at the stop position 45, the side and roof brushes 28, 29 and 31 are activated, wherein the front area 42 of the vehicle 40 is, however, cleaned merely by means of the roof brush 31 while the side brushes 28, 29 are not moved in a transverse direction in the front area 42 of the vehicle.

If a relatively short vehicle is cleaned by means of the vehicle washing facility 25, this results in the beam of light 36 of the light barrier 33 not being interrupted during its positioning in the drive-in position 38. The relatively short vehicle is, consequently, not moved further forwards as far as the stop position 45. The cleaning process begins, on the contrary, with the vehicle positioned in the drive-in position 38 and so its front area can be cleaned not only by means of the side brushes 28 and 29 but also by means of the roof brush 31.

The cleaning of the longitudinal sides 43, 44 as well as the rear area 41 of the extra long vehicle 40 is brought about in a customary manner by means of the side brushes 28 and 29 and the roof brush 31, as explained in the above with reference to FIGS. 1 and 2.

The deactivation of a transverse movement of the side brushes 28 and 29 in the front area 42 when the beam of light 36 is interrupted on account of the extra long vehicle 40 can be brought about by means of a control unit which is not illustrated in the drawings and is in electrical communication not only with the light barrier 33 but also with a drive for the transverse movement of the side brushes 28, 29. It may be reliably ensured by means of the control unit that a transverse movement of the side brushes 28, 29 in the front area 42 of the vehicle 40 is not brought about and so this can be positioned between the side brushes 28, 29 without damage to it.

Figure 6:
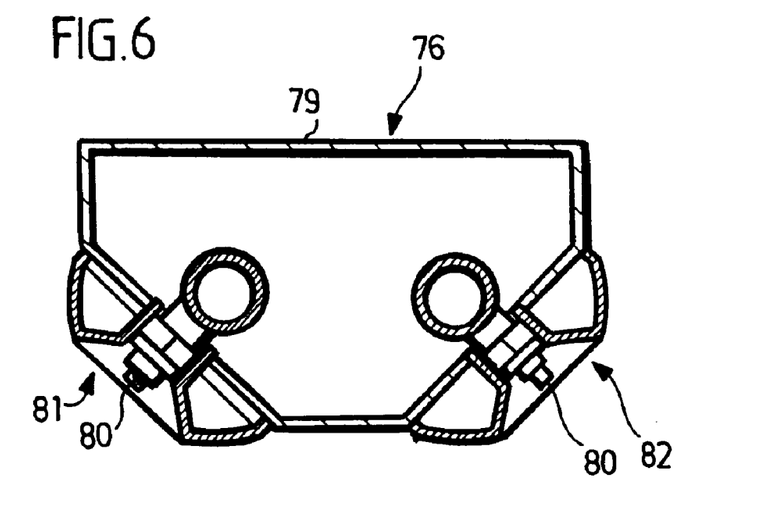
FIG. 6: shows a sectional view along line 6—6 in FIG. 5.
Figure 7:
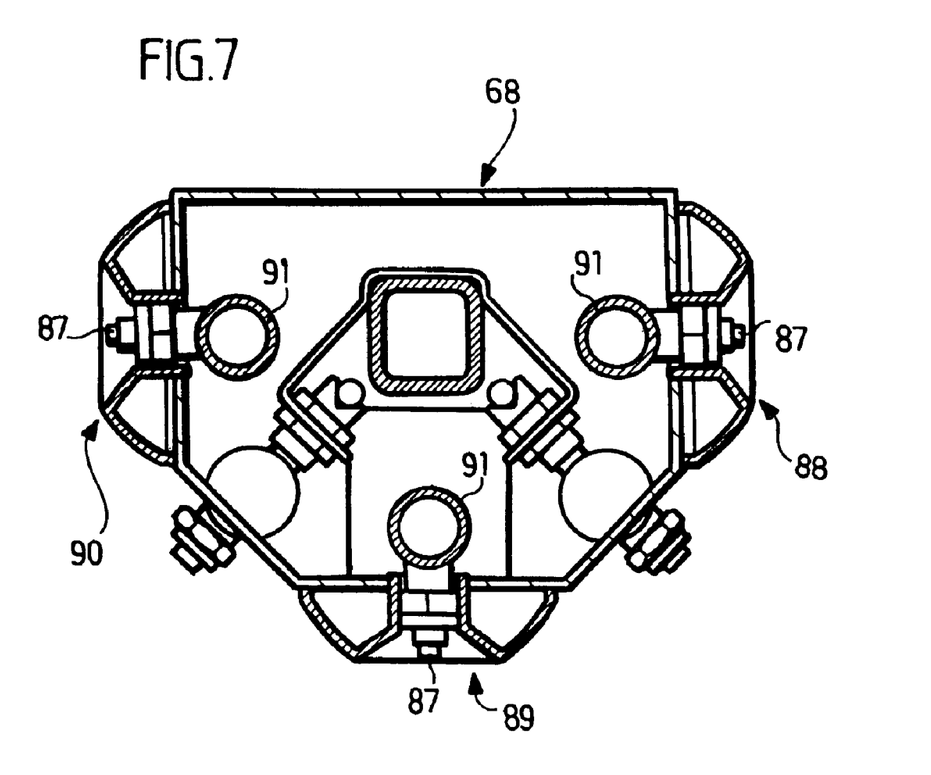
FIG. 7: shows a sectional view along line 7—7 in FIG. 5.
Figure 8:
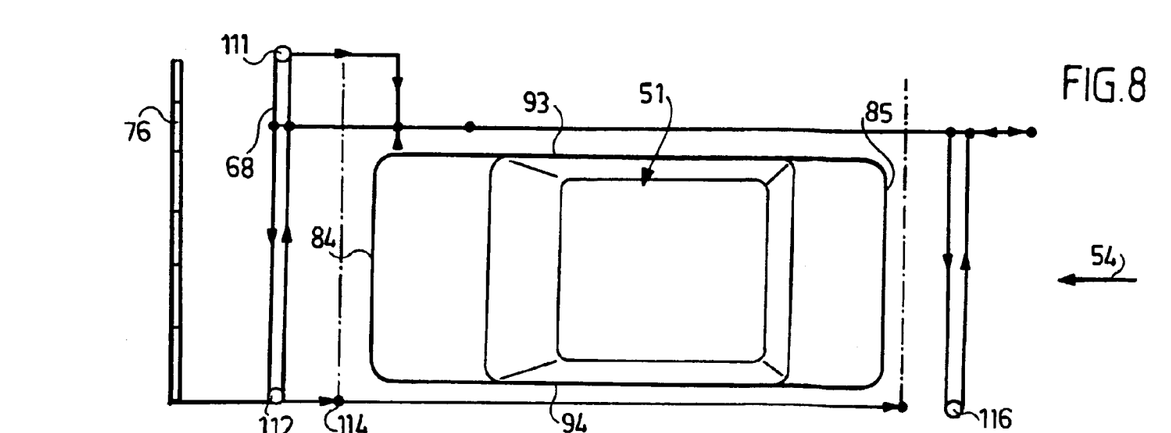
FIG. 8: shows a schematic illustration of a method for cleaning a relatively short vehicle in the vehicle washing facility according to FIG. 5 and FIG. 9: shows a schematic illustration of a method for cleaning an extra long vehicle in the vehicle washing facility according to FIG. 5.
Figure 9:
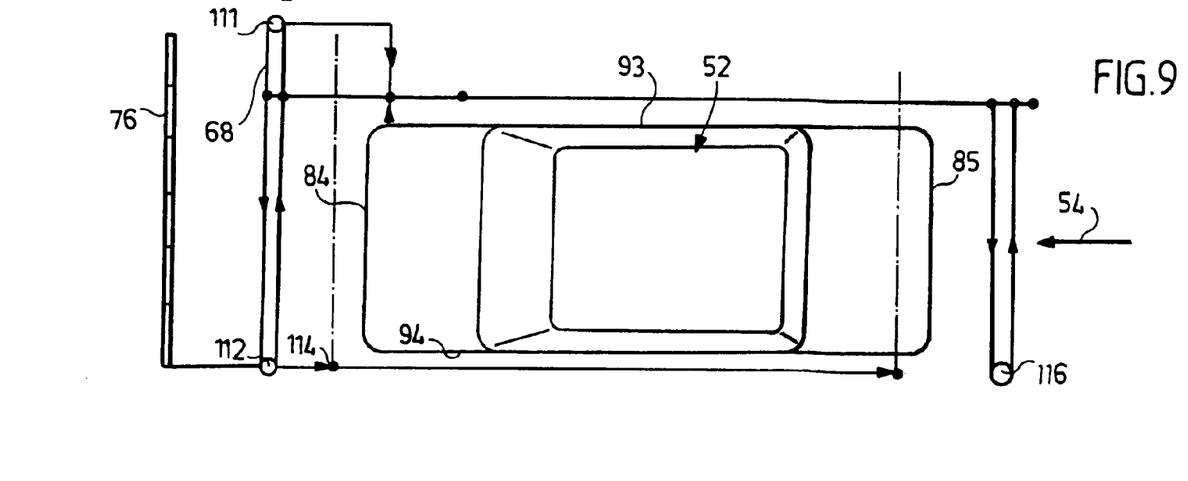

A second embodiment of an inventive vehicle washing facility is illustrated schematically in FIGS. 5 to 9 and this is designated altogether with the reference numeral 50. Not only a relatively short vehicle, as illustrated in FIG. 8 with the reference numeral 51, but also a relatively long vehicle, as illustrated in FIG. 9 with the reference numeral 52, can be cleaned by means of the vehicle washing facility 50. For this purpose, the vehicles 51, 52 can be parked on a track 53 once they have been driven into a wash area of the vehicle washing facility 50 in drive-in direction 54.

Figure 5:
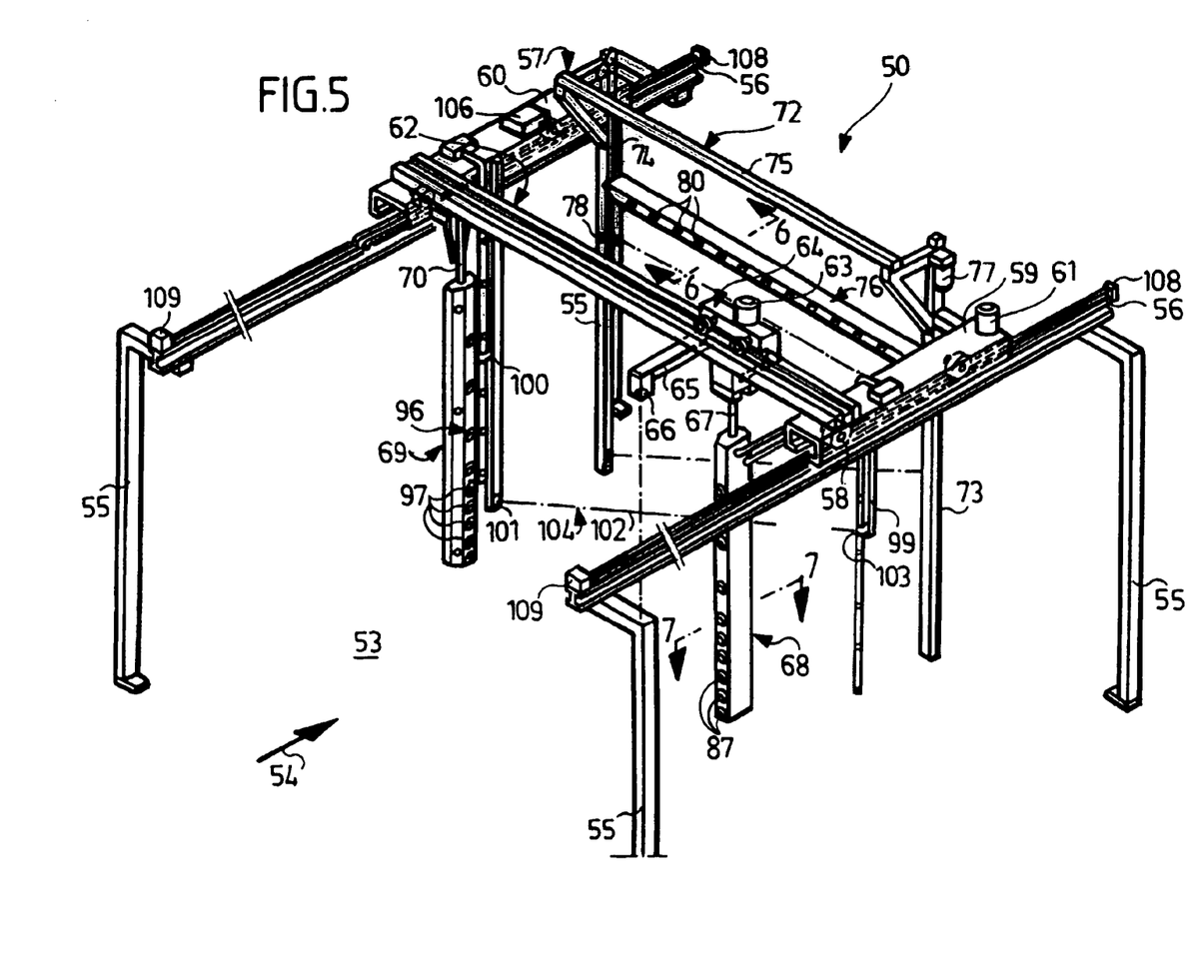
FIG. 5: shows a diagrammatic view of a second embodiment of an inventive vehicle washing facility.

As is apparent from FIG. 5, vertical supports 55 are arranged on both sides of the track 53 and these bear rails 56 extending along the track 53 at their upper ends above the motor vehicles to be cleaned.

The rails 56 support a transport device 57 which comprises transport carriages 59, 60 each displaceable along one rail 56 by means of transport wheels 58 as well as a common electric drive 61.

The two transport carriages 59, 60 are connected to one another via a cross bar 62, on which a traveling carriage 64, which can be driven by means of an electric motor 63, is mounted for displacement transversely to the longitudinal direction of the vehicles 51, 52. At its end area facing the transport carriage 60, the traveling carriage 64 bears an extension arm 65 which projects contrary to the drive-in direction 54 and at the free end of which a control sensor in the form of a reflex sensor 66 facing the track 53 is arranged.

A nozzle support arm 67 is held suspended on the traveling carriage 64 at a distance to the extension arm 65 and this supports a nozzle arrangement 68 which is vertically aligned and can be moved by means of the traveling carriage 64 in a transverse direction and by means of the transport carriages 59, 60 in a longitudinal direction of the vehicles 51, 52 to be cleaned.

An additional, vertically aligned nozzle arrangement 69 is held on a nozzle support arm 70 which is rigidly connected to the transport carriage 60. This vertical nozzle arrangement 69 can be moved by means of the transport carriage 60 in a longitudinal direction of the vehicles 51, 52 to be cleaned, a displaceability in a transverse direction is not provided.

In addition to the cross bar 62, the two transport carriages 59, 60 have a supporting portal frame 72 between them with two vertically aligned guide beams 73, 74 and a cross beam 75, via which the two guide beams 73, 74 are connected to one another. A horizontally aligned nozzle arrangement 76 is mounted on the guide beams 73, 74 so as to be movable in a vertical direction, wherein a motor 77 for its drive is arranged at the upper end of the guide beam 73. The nozzle arrangement 76 may be moved by means of the transport carriages 59, 60 in a longitudinal direction of the vehicles 51, 52 to be cleaned and, in addition, be adjusted in a vertical direction by means of the motor 77. In order to guide the nozzle arrangement 76 in accordance with the contour of the vehicles 51, 52 to be cleaned, a control sensor in the form of a light barrier 78 is arranged beneath the nozzle arrangement 76, connected rigidly to the nozzle arrangement 76 via connecting members not illustrated in the drawings. The contour of the vehicle can be detected by means of the light barrier 78 and the motor 77 of the nozzle arrangement 76 can be activated in accordance with a control signal made available by the light barrier 78. As a result, it may be ensured that the nozzle arrangement 76 can be positioned at a predeterminable distance in relation to the surface of the vehicle.

The same applies for the reflex sensor 66, with the aid of which it can be ensured that the vertical nozzle arrangement 68 can be positioned at a predeterminable distance in relation to the surface of the vehicle to be cleaned.

The vertically aligned nozzle arrangement 68 forms a first cleaning tool which can be moved not only in a transverse direction but also in a longitudinal direction of the vehicles 51, 52 to be cleaned and a second cleaning tool, which is adjustable in a vertical direction in accordance with the contour of the vehicle and can be moved past the vehicle in a longitudinal direction thereof, is made available with the horizontally aligned nozzle arrangement 76.

The construction of the horizontally aligned nozzle arrangement 76 is apparent, in particular, from FIG. 6. The nozzle arrangement 76 comprises a nozzle beam 79, which is mounted on the guide beams 73, 74 with its free end sides so as to be displaceable in a vertical direction and bears on its underside facing the track 53 two groups of high pressure nozzles 80 which are placed in a row at equal distances in a horizontal direction, wherein a first group of nozzles 81 is aligned with a directional component contrary to the drive-in direction 54 and a second group of nozzles 82 with a directional component in drive-in direction 54, each at an angle to the track 53. The high pressure nozzles 80 of the first and second group of nozzles 81 and 82, respectively, can be acted upon with a cleaning liquid in a manner known per se and not, therefore, illustrated in the drawings so that the roof and the hood of the vehicles 51, 52 to be cleaned as well as their front areas 84 and their rear areas 85 can be sprayed with the cleaning liquid by at least one of the groups of nozzles 81, 82.

The construction of the vertically aligned nozzle arrangement 68 which can be moved not only in a longitudinal but also in a transverse direction is apparent, in particular, from FIG. 7. The nozzle arrangement 68 comprises altogether three groups of high pressure nozzles 87 which are placed in a row in a vertical direction, wherein a first group of nozzles 88 is aligned contrary to the drive-in direction 54 so that the front area 84 of the vehicles 51, 52 to be cleaned can be sprayed with cleaning liquid by means of this first group of nozzles 88. A second group of nozzles 89 is arranged so as to be offset through 90° in relation to the first group of nozzles 88 so that a longitudinal side 93 of the vehicles 51, 52 to be cleaned can be sprayed with cleaning liquid by means of the second group of nozzles 89. A third group of nozzles 90 is arranged so as to be offset through 180° in relation to the first group of nozzles 88 and makes it possible to spray the rear area 85 of the vehicles 51, 52 with cleaning liquid during an additional transverse movement of the nozzle arrangement 68.

The high pressure nozzles 87 of the first, second and third groups of nozzles 88, 89, 90 are each connected to one another via a supply line 91, via which the respective high pressure nozzles 87 of the individual groups of nozzles can be selectively acted upon with cleaning liquid.

In contrast to the nozzle arrangement 68, the vertically aligned nozzle arrangement 69 has only one single group of nozzles 96 with several high pressure nozzles 97 which are placed in a row in a vertical direction and are aligned transversely to the longitudinal direction of the track 53 so as to face a longitudinal side 94 of the vehicles 51, 52 to be cleaned.

A support 99 and 100, respectively, which projects downwards in the direction towards the track 53, is fixed on the respective transport carriages 59, 60 between the vertical nozzle arrangements 68, 69 and the horizontal nozzle arrangement 76, wherein the support 100 arranged on the transport carriage 60 has a greater length than the support 99 arranged on the transport carriage 59. A light emitter 101 is held at the free end of the support 100 and this directs a beam of light 102 onto a light receiver 103 arranged at the free end of the support 59. The light emitter 101 forms in combination with the light receiver 103 a light barrier 104 which is aligned at an angle to the horizontal.

The light receiver 103 is, like the reflex sensor 66 and the light receiver of the light barrier 78, connected via electric connecting lines, which are known per se and, therefore, not illustrated in the drawings in order to achieve better clarity, to an electric control unit 106 which is arranged on the transport carriage 60 and, for its part, is in communication with the motor 77 of the horizontally aligned nozzle arrangement 67 via an electric connecting line.

The rails 56 bear at their front ends in drive-in direction 54 as well as at their rear ends with respect to the drive-in direction 54 a respective front and rear end switch 108, 109 which are connected electrically to the control unit 106 via electric connecting lines which are likewise not illustrated in the drawings. This control unit is, on the other hand, coupled to the electric drive 61 of the transport carriages 59 and 60.

The cleaning of motor vehicles by means of the vehicle washing facility 50 will be explained in the following with reference to FIGS. 8 and 9. In order to simplify the illustration, only the paths of movement of the vertically aligned nozzle arrangement 68 and the horizontally aligned nozzle arrangement 76 are illustrated in these Figures. As already explained, the additional, vertical nozzle arrangement 69 is moved in accordance with the nozzle arrangement 68 in a longitudinal direction but not in a transverse direction.

As is apparent, in particular, from FIG. 5, the vertical nozzle arrangement 68 forming a first cleaning tool is arranged with respect to the drive-in direction 54 so as to be offset in relation to the horizontal nozzle arrangement 76 forming a second cleaning tool. The latter nozzle arrangement forms a front cleaning tool whereas the nozzle arrangement 68 forms a rear cleaning tool. For the cleaning of a vehicle, this is positioned at a predeterminable distance in relation to a starting position 111 of the nozzle arrangement 68 illustrated in FIGS. 8 and 9. The distance can, for example, be 30 cm.

The horizontal nozzle arrangement 76 is arranged in drive-in direction 54 at a distance to the vertical nozzle arrangement 68 in front of the vehicle to be cleaned. The positioning of the vehicle to be cleaned is brought about in the same way not only for a relatively short vehicle 51 (cf. FIG. 8) but also for an extra long vehicle 52 (cf. FIG. 9). After a wash program has been started, the nozzle arrangement 68 is moved first of all transversely to the vehicles 51, 52 to be cleaned along the front 84 of the vehicle until it reaches a proximity or contact switch 112 which is located opposite the starting position 111 and indicates that an end position has been reached. Subsequently, the nozzle arrangement 68 is moved back again into the starting position 111 and during this movement back and forth the front 84 of the vehicle is sprayed with cleaning liquid by means of the high pressure nozzles 87 of the first group of nozzles 88.

In a next method step, the vertical nozzle arrangements 68 and 69 as well as the horizontal nozzle arrangement 76 are moved by means of the transport device 57 a defined distance of, for example, 30 cm contrary to the drive-in direction 54 towards the vehicles 51 and 52, respectively. Subsequently, a renewed transverse movement of the nozzle arrangement 68 is brought about by means of the traveling carriage 64 until the reflex sensor 66 held on the extension arm 65 is activated and, therefore, indicates that the longitudinal side 93 of the vehicle 51 and 52, respectively, has been reached. Subsequently, the traveling carriage 64 is moved again in the direction going away from the longitudinal side 93 until the reflex sensor 66 is free again, wherein it is then ensured on account of the selected length of the extension arm 65 that the nozzle arrangement 68 is at a predetermined distance in relation to the longitudinal side 93 of the vehicle. All the nozzle arrangements are then moved by means of the transport device 57 to such an extent contrary to the drive-in direction 54 until the horizontally aligned nozzle arrangement 76 takes up a front position 114 directly in front of the front area 84 of the vehicle 51 and 52, respectively, to be cleaned. The movement of the transport device 57 along the rails 56 is then interrupted and so the front area of the vehicle 51 and 52, respectively, to be cleaned can be cleaned a second time by means of a vertical movement of the horizontal nozzle arrangement 76.

In a further method step, all the nozzle arrangements are moved contrary to the drive-in direction 54, wherein the longitudinal sides 93 and 94 of the vehicle are cleaned by means of the vertical nozzle arrangements 68 and 69 and the hood and the roof of the vehicles 51 and 52, respectively, by means of the horizontally aligned nozzle arrangement 76.

If the light barrier 104 indicates that the rear 85 of the vehicle has been passed, the longitudinal travel of the transport device 57 is stopped and the electric motor 63 is activated again for moving the traveling carriage 64 and, with it, the vertical nozzle arrangement 68 so that this can be moved along the rear 85 of the vehicle transversely to the vehicle 51 and 52, respectively, until the activation of a proximity switch 116 indicates that an end position has been reached and the nozzle arrangement 68 is subsequently moved along the rear 85 of the vehicle again to the side. It is ensured on account of the selected distance between the light barrier 104 detecting the rear 85 of the vehicle and the nozzle arrangement 68 that the nozzle arrangement 68 is at a predetermined distance in relation to the vehicle 51 and 52, respectively, during its transverse movement behind the vehicle 51 and 52, respectively.

Following movement of the nozzle arrangement 68 back and forth in the rear area of the vehicle 51, the transport device 57 is moved further contrary to the drive-in direction 54 for such a time until the light barrier 78 associated with the horizontally aligned nozzle arrangement 76 likewise indicates that the rear 85 of the vehicle has been reached. In this position, the horizontal nozzle arrangement 76 is then moved in a vertical direction for the additional cleaning of the rear 85 of the vehicle.

If, however, the extra long vehicle 52 is intended to be cleaned, it is possible that the rear end switches 109 indicating that the rear end position of the transport device 57 has been reached are already activated before the horizontal nozzle arrangement 76 reaches the rear area 85 of the extra long vehicle 52. In this case, the horizontal nozzle arrangement 76 is deactivated by means of the control unit 106 and so the rear 85 of the extra long vehicle 52 is cleaned merely with the aid of the vertical nozzle arrangement 68. The evaluation of the signals made available by the light barriers 104 and 78 as well as the rear end switch 109 makes it possible for the control unit 106 to use for cleaning the rear of the vehicle either not only the first but also the second cleaning tools or, however, —when an extra long vehicle is present—only the first cleaning tools, depending on the length of the vehicle to be cleaned.

What is claimed is:

1. Method for cleaning a vehicle with a vehicle washing facility, comprising:
   providing a first cleaning tool vertically aligned with and adapted to be movable past the vehicle to be cleaned in a longitudinal and in a transverse direction thereof;
   providing a second cleaning tool horizontally aligned, with and adapted to be movable in a longitudinal direction of the vehicle and adjustable in a vertical direction in accordance with the contour of the vehicle; and
   checking whether the length of the vehicle exceeds a predetermined maximum value using a checking device;
   wherein:
   at least one of the rear of the vehicle and the front of the vehicle are cleaned with one of the first or the second cleaning tool when the length of the vehicle exceeds the maximum value; and
   the rear and front of the vehicle are cleaned with both the first and second cleaning tools when the length of the vehicle is within the maximum value.

2. Method as defined in claim 1, wherein prior to activating the first and second cleaning tools it is first checked whether the length of the vehicle exceeds the maximum value.

3. Method as defined in claim 2, wherein prior to activating the first and second cleaning tools the vehicle is moved beyond a predeterminable drive-in position forwards as far as a stop position and its front area is subsequently cleaned only with the second cleaning tool when the length of the vehicle exceeds the maximum value.

4. Method as defined in claim 1, wherein when at least one of the first and second cleaning tool is already activated, the checking device checks whether the length of the vehicle exceeds the maximum value.

5. Method as defined in claim 1, wherein the rear of the vehicle is cleaned only with the first cleaning tool when the length of the vehicle exceeds the maximum value.

6. Method as defined in claim 1, wherein the checking device comprises at least one sensor operating without contact with the vehicle.

7. Vehicle washing facility for cleaning a vehicle, comprising:
   a first cleaning tool vertically aligned with and movable past the vehicle to be cleaned in a longitudinal and in a transverse direction thereof;
   a second cleaning tool horizontally aligned, with and movable in a longitudinal direction of the vehicle and adjustable in a vertical direction in accordance with the contour of the vehicle; and
   a checking device for checking whether the length of the vehicle exceeds a predetermined maximum value;
   wherein:
   one of the first cleaning tool or the second cleaning tool is adapted to be activated for cleaning at least one of the front of the vehicle and the rear of the vehicle when the length of the vehicle exceeds the maximum value; and
   both the first and second cleaning tools are adapted to be activated for cleaning the front and rear of the vehicle when the length of the vehicle is within the maximum value.

8. Vehicle washing facility as defined in claim 7, wherein the checking device comprises a sensor unit positioned at a predetermined distance in relation to a front end of the vehicle washing facility with respect to a drive-in direction of the vehicle to be cleaned.

9. Vehicle washing facility as defined in claim 8, wherein the sensor unit is designed as a light barrier.

10. Vehicle washing facility as defined in claim 7, wherein two first cleaning tools are provided, each positionable on one side of the vehicle to be cleaned.

11. Vehicle washing facility as defined in claim 10, wherein the two first cleaning tools are designed as wash brushes each rotatable about a vertical axis of rotation.

12. Vehicle washing facility as defined in claim 7, wherein the second cleaning tool is designed as a wash brush rotatable about a horizontal axis of rotation.

13. Vehicle washing facility as defined in claim 7, wherein the first cleaning tool comprise at least one vertically aligned nozzle arrangement for spraying cleaning liquid for cleaning the vehicle.

14. Vehicle washing facility as defined in claim 13, wherein:
   the nozzle arrangement comprises at least two groups of nozzles,
   a first group of nozzles faces the vehicle to be cleaned during a transverse movement of the nozzle arrangement, and
   a second group of nozzles faces the vehicle to be cleaned during a longitudinal movement of the nozzle arrangement.

15. Vehicle washing facility as defined in claim 13, wherein:
   at least one nozzle arrangement comprises three groups of nozzles,
   a first group of nozzles faces the vehicle during a transverse movement in front of the vehicle to be cleaned,
   a second group of nozzles faces the vehicle during a longitudinal movement along a longitudinal side of the vehicle, and
   a third group of nozzles faces the vehicle during a transverse movement behind the vehicle to be cleaned.

16. Vehicle washing facility as defined in claim 7, wherein;
   the second cleaning tool is designed as a horizontally aligned nozzle arrangement for spraying cleaning liquid and comprising first and second groups of nozzles, and
   with respect to a drive-in direction of the vehicle to be cleaned the first group of nozzles is directed at the vehicle with a directional component pointing rearwards at an angle and the second group of nozzles with a directional component pointing forwards at an angle.

17. Vehicle washing facility as defined in claim 7, wherein control sensors are associated with the first and second cleaning tools for controlling the cleaning tools during their movement along the vehicle.

18. Vehicle washing facility as defined in claim 7, wherein;
   with respect to a drive-in direction of the vehicle to be cleaned the first and second cleaning tools are held on a transport device displaceable along a guideway so as to be offset relative to one another and form front and rear cleaning tools,
   an end sensor is arranged between the front and rear cleaning tools for detecting at least one of the front and rear end of the vehicle.

19. Vehicle washing facility as defined in claim 18, wherein the end sensor comprises a light barrier aligned at an angle to the horizontal.

20. Vehicle washing facility as defined in claim 18, further comprising at least one of a front and a rear end switch making a signal available as soon as the transport device has reached at least one of the front and rear end of the guideway with respect to the drive-in direction of the vehicle to be cleaned.

21. Vehicle washing facility as defined in claim 20, wherein:
   the checking device comprises a control unit coupled to the end switch, the end sensor, and the control sensor of at least one of the front and rear cleaning tool for controlling at least one of the front and rear cleaning tools for cleaning at least one of the front of the vehicle and the rear of the vehicle.

22. Vehicle washing facility as defined in claim 21, wherein the front cleaning tool with respect to the drive-in direction of the vehicle to be cleaned is adapted to be deactivated by means of the control unit when the rear end switch and the control sensor of the front cleaning tool are activated and the end sensor indicates the rear of the vehicle has been passed.

23. Vehicle washing facility as defined in claim 21, wherein the rear cleaning tool with respect to the drive-in direction of the vehicle to be cleaned is adapted to be deactivated by means of the control unit when the front end switch and the control sensor of the rear cleaning tool are activated and the end sensor indicates the front of the vehicle has been passed.

* * * * *

UNITED STATES PATENT AND TRADEMARK OFFICE
CERTIFICATE OF CORRECTION

PATENT NO. : 6,905,554 B2
DATED : June 14, 2005
INVENTOR(S) : Berger et al.

It is certified that error appears in the above-identified patent and that said Letters Patent is hereby corrected as shown below:

Column 12,
Line 40, delete the "," after the word "aligned".

Column 13,
Line 14, delete the "," after the word "aligned".

Column 14,
Line 24, after the word "wherein" delete the ";" and replace it with -- : --.

Signed and Sealed this

Sixth Day of September, 2005

JON W. DUDAS
*Director of the United States Patent and Trademark Office*